(12) United States Patent
Lin et al.

(10) Patent No.: US 8,310,849 B2
(45) Date of Patent: Nov. 13, 2012

(54) PULSE WIDTH MODULATION REGULATOR IC AND CIRCUIT THEREOF

(75) Inventors: Chun-Ming Lin, Hsinchu (TW); Ker Cheng Liu, Taoyuan County (TW)

(73) Assignee: Niko Semiconductor Co., Ltd., Taipei County (TW)

( * ) Notice: Subject to any disclaimer, the term of this patent is extended or adjusted under 35 U.S.C. 154(b) by 360 days.

(21) Appl. No.: 12/751,092

(22) Filed: Mar. 31, 2010

(65) Prior Publication Data

US 2011/0057638 A1    Mar. 10, 2011

(30) Foreign Application Priority Data

Sep. 7, 2009    (TW) ................................ 98130089 A (51) Int. Cl.
*H02M 1/12*    (2006.01)

(52) U.S. Cl. .......... 363/41; 363/124; 323/282; 323/288; 327/175

(58) Field of Classification Search ................. 363/41, 363/124; 323/287, 282, 288; 327/175
See application file for complete search history.

(56) References Cited

U.S. PATENT DOCUMENTS 6,909,619 B2 *    6/2005    Saeki et al. .................... 363/50

* cited by examiner

*Primary Examiner* — Arnold Kinkead
(74) *Attorney, Agent, or Firm* — Rosenberg, Klein & Lee (57) ABSTRACT

A pulse width modulation regulator IC is provided for controlling a duty cycle of at least one switch to convert one input voltage signal into an output voltage. An input pin is provided for receiving an input signal different from the input voltage signal. The input signal has a lasting time substantially the same as the time that input voltage signal situated at a high level, but the waveforms of the two signals are different. The input signal is converted into a square wave signal by a conversion unit, and a PWM signal is generated by a PWM controller according to the square wave signal to control the duty cycle of the switch. Therefore, the input pin can be saved by adjusting an internal or external circuit of the IC for the usage of the different kinds of input signals without increasing the number of input pins of the IC.

20 Claims, 9 Drawing Sheets

PULSE WIDTH MODULATION REGULATOR IC AND CIRCUIT THEREOF

BACKGROUND OF THE INVENTION

1. Field of the Invention

The present invention relates to a regulator integrated circuit (IC) and its application circuit, in particular, to a method of reducing the number of pins of the pulse width modulation regulator IC and a circuit thereof 2. Description of Related Art With reference to FIG. 1 for a schematic view of a conventional synchronous buck DC-to-DC converter circuit, the DC-to-DC converter circuit includes two alternately conducted switches Q1, Q2 connected in series between an input terminal for an input voltage signal Vin and a ground terminal G. The level of an output voltage Vo can be adjusted by changing duty cycles of the two switches Q1, Q2. A filter circuit composed of an inducer L1 and a capacitor C2 is coupled to a junction of the two switches Q1, Q2 for stabilizing the output voltage Vo.

Figure 1:
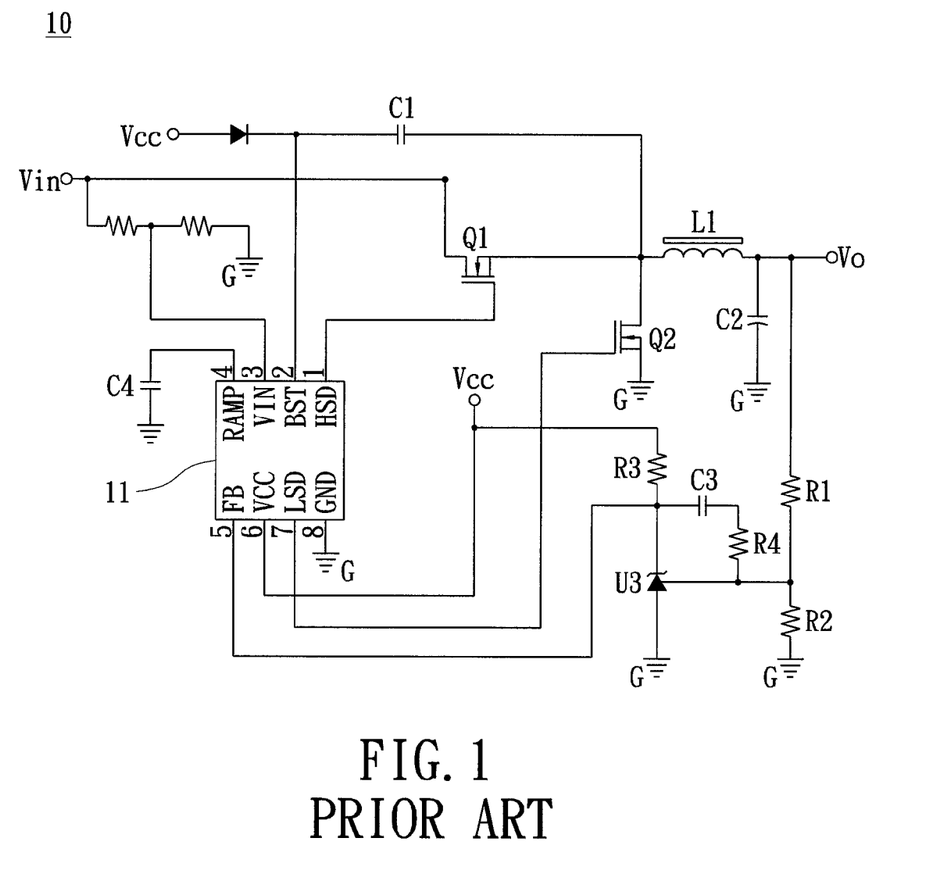
FIG. 1 is a circuit diagram of a conventional synchronous buck DC-to-DC converter circuit.

The above mentioned switches Q1, Q2 are generally N-type metal oxide semiconductor field effect transistors (MOSFETs) for the purpose of low conduction loss. However, the high voltage switch Q1 coupled to the input terminal needs a driving voltage with a potential higher than the input voltage signal Vin.

In FIG. 1, a conventional method using a bootstrap capacitor C1 to boost the level of the drive voltage so as to provide a voltage level required for driving the high voltage switch Q1 is provided. A terminal of the bootstrap capacitor C1 is coupled to a voltage supply terminal for receiving a drive voltage signal Vcc, and another terminal of the bootstrap capacitor C1 is coupled to the low voltage switch Q2. When the low voltage switch Q2 is conducted, a charging path is formed between the voltage supply terminal and the ground terminal G for charging the bootstrap capacitor C1 to raise the potential at a high voltage side of the bootstrap capacitor C1 to a level above the input voltage signal Vin in order to drive the high voltage switch Q1.

The DC-to-DC conversion circuit includes a pulse width modulation (PWM) regulator IC 11 for controlling duty cycles of the switches Q1, Q2. The PWM regulator IC 11 has eight pins, which are labeled HSD, BST, VIN, RAMP, FB, VCC, LSD and GND respectively, wherein the VIN pin is provided for receiving the input voltage signal Vin, and the GND pin is a grounded terminal, the HSD pin and the LSD pin are provided for outputting a first drive signal (HSD) and a second drive signal (LSD) for driving the high voltage switch Q1 and the low voltage switch Q2 respectively, the BST pin is provided for receiving a boost voltage for driving the high voltage switch Q1, the RAMP pin is provided for receiving a sawtooth wave signal Vramp, the VCC pin is provided for supplying a drive voltage required for the PWM regulator IC 11, and the FB pin is provided for receiving a feedback signal Vfb from an output terminal of the synchronous buck DC-to-DC converter circuit 10.

The DC-to-DC conversion circuit 10 also includes a voltage divider circuit composed of resistors R1, R2 and a feedback circuit composed of a resistor R4, a capacitor C3, a resistor R3 and a Zener diode U3. The output voltage Vo is converted into the feedback signal Vfb through the voltage divider circuit and the feedback circuit.

The bootstrap capacitor C1 is provided for generating a boost voltage with a potential higher than the input terminal signal. The RAMP pin of the PWM regulator IC 11 is coupled to a capacitor C4, which is charged and discharged alternately to generate a sawtooth wave signal Vramp for the PWM regulator IC 11 to proceed a certain comparison step, which allows the PWM controller to generate the first and second drive signals HSD, LSD to adjust the duty cycles of the transistor switches Q1, Q2.

The PWM regulator IC 11 generally contains an error amplifier installed therein for comparing the feedback signal Vfb with a reference voltage to compensate and modulate the circuit. It is necessary to connect an output terminal of the error amplifier to a capacitor (not shown in the figure) for filtering out unwanted noises contained in the feedback signal Vfb. As the capacitor is installed outside the PWM regulator IC 11, and a COMP pin (not shown in the figure) is demanded for connecting the capacitor to the PWM regulator IC 11. However, such circuit layout increases the number of pins, incurs a higher manufacturing cost, and even results in a failure of packaging the PWM regulator IC 11 into the existing standard IC packaging structure. Conversely, if the capacitor is installed inside the PWM regulator IC 11, the size of the IC would be increased, and the capacitor installed in the IC 11 cannot be adjusted according to application requirements, which may affect the flexibility of the PWM regulator IC 11 in practical applications.

SUMMARY OF THE INVENTION

Therefore, it is a primary objective the present invention to provide a PWM regulator IC and its application circuit design. In accordance with the PWM regulator IC of the present invention, a pin can be kept for other applications, or the types of input signals to the IC can be increased merely by adjusting internal or external circuit of the IC without the need of increasing the number of pins.

To achieve the foregoing objective, the present invention provides a regulator IC for controlling a duty cycle of at least one switch to convert an input voltage signal into an output voltage, and the regulator IC comprises a pin, a conversion unit, and a PWM controller. The pin is utilized for receiving an input signal different from the input voltage signal. The lasting time of the input signal is substantially the same as the time of the input voltage signal situated at a high level, but the waveforms of the two signals are different. The conversion unit is coupled to the pin for converting the input signal into a square wave signal. The PWM controller is utilized for generating at least one PWM drive signal according to the square wave signal to control the duty cycle of the switch.

To achieve the foregoing objective, the present invention provides a PWM synchronous buck DC-to-DC converter circuit for receiving an input voltage signal and generating an output voltage, and the converter circuit comprises at least one switch and a regulator IC. The level of the output voltage is adjusted by changing the duty cycle of the switch. The regulator IC includes a pin, a conversion unit, and a PWM controller. The pin is utilized for receiving an input signal different from the input voltage signal. The lasting time of the input signal is substantially the same as the time of the input voltage signal situated at a high level, but the waveforms of the two signals are different. The conversion unit is coupled to the pin for converting the input signal into a square wave signal. The PWM controller is utilized for generating at least one PWM drive signal to control the duty cycle of the switch according to the square wave signal.

To achieve the foregoing objective, the present invention provides a PWM synchronous buck DC-to-DC converter circuit which comprises a wave mixer and a regulator IC. The wave mixer is utilized for receiving an input voltage signal and a feedback signal and mixing the input voltage signal and the feedback signal to generate a mixed wave signal, wherein the input voltage signal has a frequency much greater than that of the feedback signal. The regulator IC comprises an input signal pin, a comparator, an error amplifier, and a PWM controller. The input signal pin is utilized for receiving the mixed wave signal. The comparator is utilized for comparing the mixed wave signal with a predetermined voltage level to generate a first output signal, wherein the first output signal has a duty cycle substantially equal to that of the input voltage signal. The error amplifier is utilized for filtering out a high frequency portion of the mixed wave signal to generate a second output signal corresponding to the feedback signal. The PWM controller is utilized for comparing the second output signal with a ramp signal to generate a comparison signal, and comparing the comparison signal with the first output signal to generate a PWM control signal accordingly.

The concept proposed in the present invention is totally different from the prior art, and the idea for reducing the number of pins of a PWM regulator IC and a circuit design for a synchronous buck DC-to-DC conversion in accordance with the present invention can enhance technologies and promote the related industry.

The objectives, technical measures and advantages of the present invention will become apparent with the detailed description of preferred embodiments and the accompanying drawings as follows.

DETAILED DESCRIPTION OF THE PREFERRED EMBODIMENTS

Figure 2:
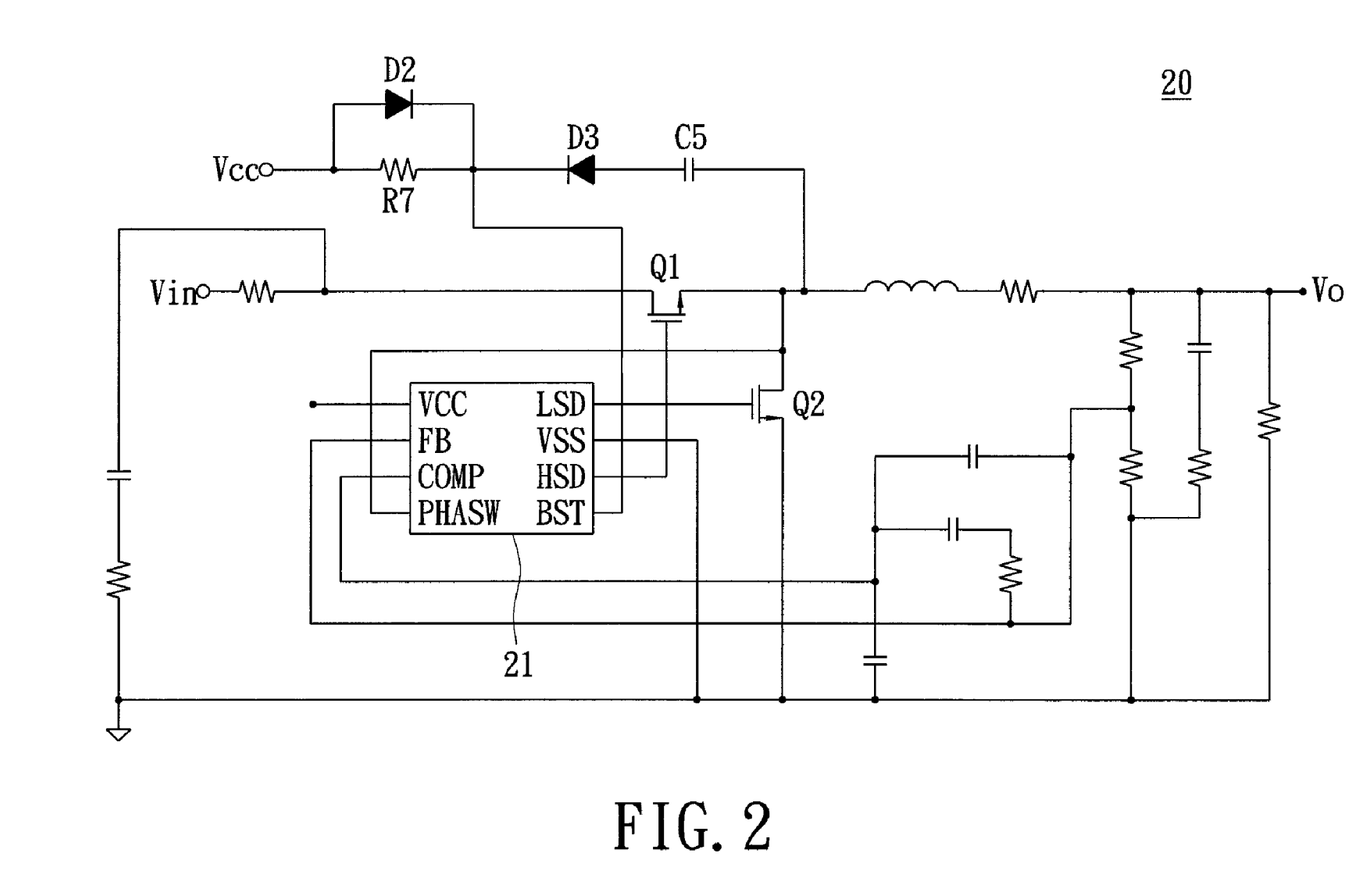
FIG. 2 is a circuit diagram of a synchronous buck DC-to-DC converter circuit in accordance with a first preferred embodiment of the present invention.

With reference to FIG. 2 for a circuit diagram of a synchronous buck DC-to-DC converter circuit in accordance with a first preferred embodiment of the present invention, the synchronous buck DC-to-DC converter circuit 20 comprises a pulse width modulation (PWM) regulator IC 21. A PWM regulator IC 21 having eight pins is illustrated in the present embodiment as an example. The pins of the PWM regulator IC 21 are labeled as VCC, FB, COMP, PHASE, LSD, VSS, HSD, and BST respectively. It is noteworthy to point out that the PWM regulator IC 21 does not need the VIN pin for receiving an input voltage signal Vin as the conventional PWM regulator IC 11 depicted in FIG. 1. In the first preferred embodiment of the present invention, the input voltage signal Vin and a bootstrap high voltage signal share the BST pin, and the saved pin is used as the COMP pin.

The synchronous buck DC-to-DC converter circuit 20 includes two switches Q1, Q2 connected in series between an input terminal and a ground terminal. The two switches Q1, Q2 are conducted alternately. By changing duty cycles of the two switches Q1, Q2, a level of the output voltage Vo can be adjusted. The synchronous buck DC-to-DC converter circuit 20 further includes a bootstrap capacitor C5 coupled to the BST pin. A terminal of the bootstrap capacitor C5 is coupled to a junction between the switch Q2 and the switch Q1, and another terminal of the bootstrap capacitor C5 is coupled to a power supply terminal for receiving a drive voltage signal Vcc through a diode D2. Furthermore, a resistor R7 is connected with the diode D2 in parallel. In another preferred embodiment, the converter circuit 20 further comprises another diode D3 connected in series between the bootstrap capacitor C5 and the BST pin.

Figure 3:
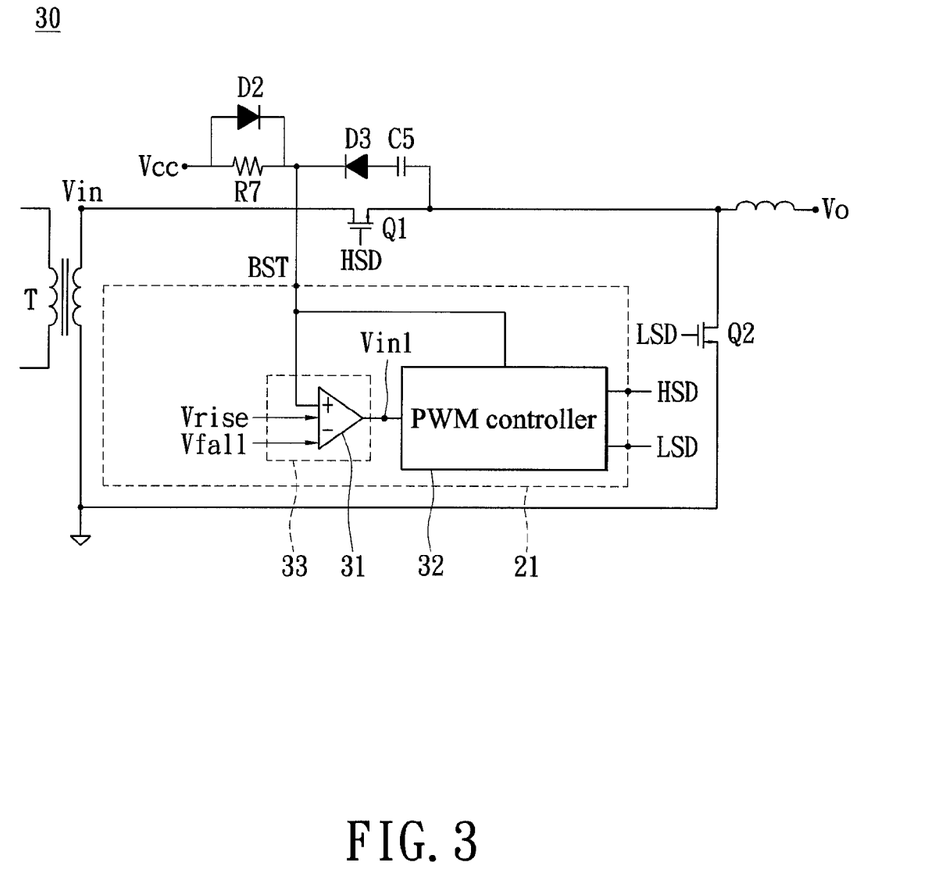
FIG. 3 is a circuit diagram of an internal circuit of a pulse width modulation regulator IC in accordance with a first preferred embodiment of the present invention.
Figure 4:
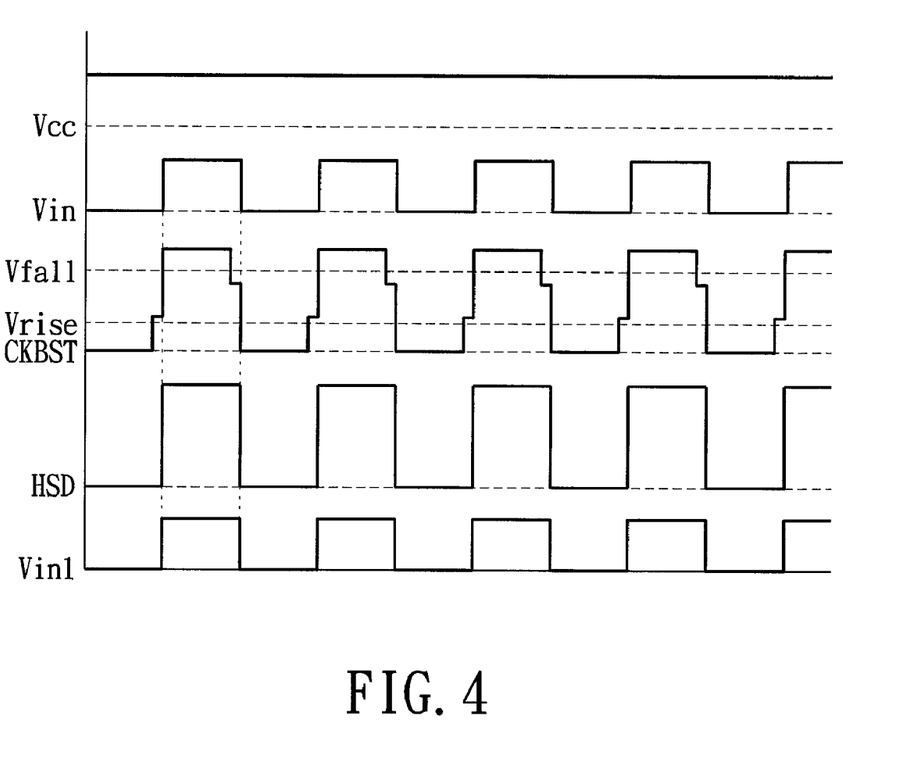
FIG. 4 is a diagram showing the waveforms of a drive voltage signal Vcc, an input voltage signal Vin, a bootstrap high voltage signal CKBST, a first drive signal HSD and an recovered signal Vin1 in the converter circuit of FIG. 3 in accordance with a preferred embodiment of the present invention.

With reference to FIGS. 3 and 4, FIG. 3 shows a circuit diagram of the internal circuit of a PWM regulator IC 21 in accordance with the first preferred embodiment of the present invention, and a secondary side synchronous buck DC-to-DC converter circuit 30 is illustrated. FIG. 4 shows waveforms of a drive voltage signal Vcc, an input voltage signal Vin, a bootstrap high voltage signal CKBST, a first drive signal HSD and an recovered signal Vin1 generated in the IC 21 in accordance with this preferred embodiment., wherein the drive voltage signal Vcc is a DC voltage signal, the bootstrap high voltage signal CKBST is generated at the BST pin, and the first drive signal HSD is provided for driving the high voltage switch Q1. Firstly, when the low voltage switch Q2 is conducted, the drive voltage signal Vcc charges the bootstrap capacitor C5 through the diode D2 quickly to increase the voltage level of a high voltage side of the bootstrap capacitor C5 to a level equal to the voltage level of the drive voltage signal Vcc. The voltage level at a high voltage side of the bootstrap capacitor C5 represents the bootstrap high voltage signal CKBST. Followed by that, when the high voltage switch Q1 is conducted, a voltage level of a junction between the low voltage switch Q2 and the high voltage switch Q1, which is also the voltage level of a low voltage side of the bootstrap capacitor C5, would be increased to a level equal to the input voltage signal Vin. Meanwhile, the voltage level of the high voltage side of the bootstrap capacitor C5 is boosted. Consequently, when the input voltage signal Vin is at a high level, the voltage level of the bootstrap high voltage signal CKBST would be boosted to a level equal to the sum of potentials of the input voltage signal Vin and the drive voltage signal Vcc. For simplicity, a voltage drop resulted by the resistor R7 and the diodes D2, D3 is ignored in this case. Then, the energy stored in the bootstrap capacitor C5 would be discharged from the resistor R7 slowly, such that the level of the bootstrap high voltage signal CKBST is declined slowly. Afterward, when the input voltage signal Vin is turned to a low level, the voltage level of the bootstrap high voltage signal CKBST would be declined rapidly.

As described above, the lasting time of the bootstrap high voltage signal CKBST is substantially the same as the time of the input voltage signal Vin situated at a high level, but their waveforms are different. Since the potential of the bootstrap high voltage signal CKBST can be boosted up to a level above the input voltage signal Vin, the PWM regulator IC 21 can use the bootstrap high voltage signal CKBST to generate a first drive signal HSD with a potential higher than the input voltage signal Vin to drive the high voltage switch Q1 and assure normal operation of the high voltage switch Q1.

In FIG. 3, the PWM regulator IC 21 includes a conversion unit 33 for converting the bootstrap high voltage signal CKBST received from the boost pin BST into a square wave signal Vin1. For example, the conversion unit 33 can be a hysteresis comparator 31, which receives the bootstrap high voltage signal CKBST, a first reference potential Vrise and a second reference potential Vfall and compaes the bootstrap high voltage signal CKBST with the first reference potential Vrise and the second reference potential Vfall to generate a square wave recovered signal Vin1. An output terminal of the conversion unit 33 is coupled to a PWM controller 32. The PWM controller 32 generates a first drive signal HSD and a second drive signal LSD according to the bootstrap high voltage signal CKBST as well as the square wave recovered signal Vin1 generated by the hysteresis comparator 31 to control the duty cycles of the high voltage switch Q1 and the low voltage switch Q2 respectively.

In FIG. 4, when the voltage level of the rising edge of the bootstrap high voltage signal CKBST is higher than the first voltage reference Vrise, the hysteresis comparator 31 is triggered to output a high level signal, and when the voltage level of the falling edge of the bootstrap high voltage signal CKBST is lower than the second voltage reference Vfall, the hysteresis comparator 31 is triggered to output a low level signal, so that a square wave recovered signal Vin1 is generated. In this preferred embodiment, the first reference potential Vrise is lower than the second reference potential Vfall. In addition, since the bootstrap high voltage signal CKBST and the input voltage signal Vin have substantially the same duty cycle, the recovered signal Vin1 generated by the conversion unit 33 may have a duty cycle substantially the same as the input voltage signal Vin.

As described in the aforementioned first preferred embodiment of the present invention, a boost pin BST pin is selected for inputting the bootstrap high voltage signal CKBST. Although the bootstrap high voltage signal CKBST has a waveform different from that of the input voltage signal Vin, the lasting time of the bootstrap high voltage signal CKBST is substantially the same as the time of the input voltage signal Vin situated at a high level. On one hand, the bootstrap high voltage signal CKBST can be converted into the square wave recovered signal Vin1 by the conversion unit 33 for generating the drive signals HSD, LSD. On the other hand, the bootstrap high voltage signal CKBST can be used to provide a high voltage level needed for the PWM controller 32 to generate the drive signal HSD. Thereby, the pin VIN for receiving the input voltage signal Vin can be saved.

Figure 5:
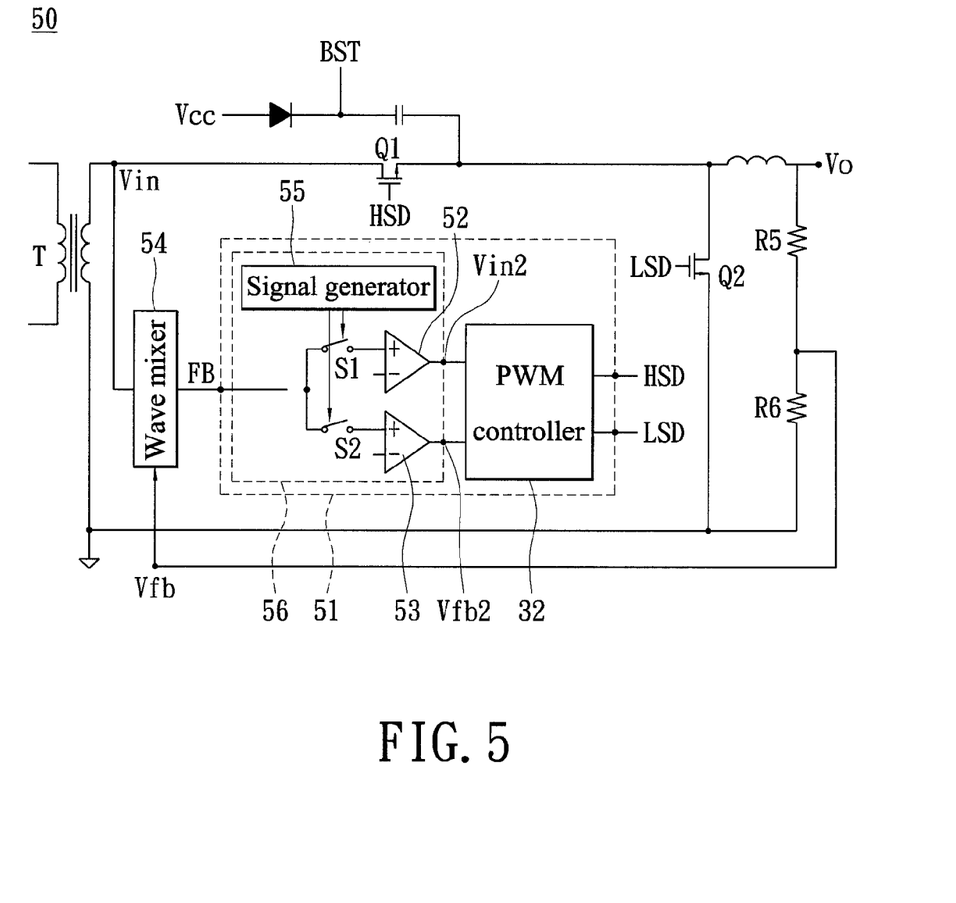
FIG. 5 is a circuit diagram of a synchronous buck DC-to-DC converter circuit in accordance with a second preferred embodiment of the present invention.
Figure 6:
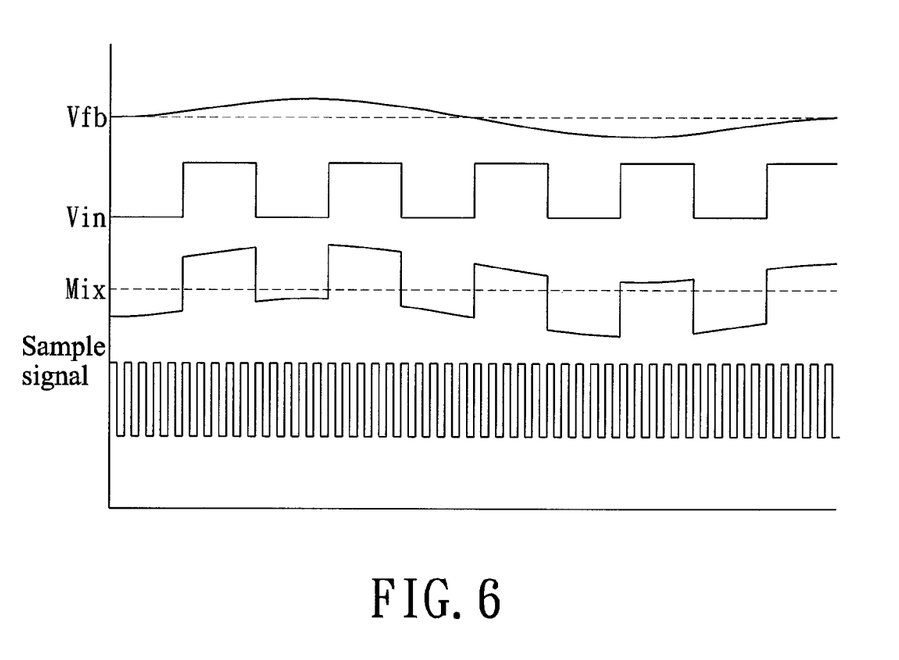
FIG. 6 is a diagram showing the waveforms of an input voltage signal Vin, a feedback signal Vfb, and a mixed signal Mix of the two signals and a sampling signal in the converter circuit of FIG. 5 in accordance with a preferred embodiment of the present invention.

FIG. 5 is a circuit diagram of a synchronous buck DC-to-DC converter circuit in accordance with a second preferred embodiment of the present invention, and a secondary side synchronous buck DC-to-DC converter circuit 50 is illustrated in the present embodiment as an example. FIG. 6 is a diagram showing the waveforms of the input voltage signal Vin, the feedback signal Vfb, a mixed signal of the aforementioned two signals and a sampling signal in accordance with the second preferred embodiment. In contrast with first embodiment of the present invention, the PWM regulator IC 51 in the present embodiment also skips the VIN pin of the pulse width modulation regulator IC 11 as depicted in FIG. 1, but the FB pin is used to receive the input voltage signal Vin instead.

In FIG. 5, an output terminal of the synchronous buck DC-to-DC converter circuit 50 is connected with a voltage divider circuit composed of resistors R5, R6 for generating a feedback signal Vfb. The input voltage signal Vin and the feedback signal Vfb are transmitted to a wave mixer 54. Referring to FIG. 6, the input voltage signal Vin has a frequency much higher than the frequency of the feedback signal Vfb, and thus the wave mixer 54 can use the feedback signal Vfb as a carrier wave to mix the high frequency input voltage signal Vin and the low frequency feedback signal Vfb to generate and a mixed signal Mix to the FB pin of the PWM regulator IC 51.

The PWM regulator IC 51 includes a conversion unit 56 installed therein for converting the mixed signal Mix received from the FB pin into a square wave signal Vin2. The conversion unit 56 includes two switches S1, S2, a comparator 52, an error amplifier 53 and a signal generator 55. Both the switches S1, S2 have on end coupled to a feedback (FB) pin, but the other ends of the two switches S1, S2 are coupled to a comparator 52 and an error amplifier 53, respectively. The switching frequencies of the switches S1, S2 are controlled by a sampling signal generated by the signal generator 55 for generating a first sample signal and a second sample signal to the comparator 52 and the error amplifier 53 respectively. The comparator 52 and the error amplifier 53 generate a first recovered signal Vin2 and a second recovered signal Vfb2 according to the first sample signal and the second sample signal respectively.

With reference to FIG. 6, the sampling signal has a frequency much higher than the frequencies of the input voltage signal Vin and the feedback signal Vfb. Thus, both the first sample signal and the second sample signal include a high frequency portion corresponding to the input voltage signal Vin and a low frequency portion corresponding to the feedback signal Vfb. The comparator 52 receives a predetermined voltage level and the first sample signal and compares the first sample signal with the predetermined voltage level to generate the first output recovered signal Vin2, which is a square wave signal having substantially the same duty cycle as the input voltage signal Vin. The error amplifier 53 receives the second sample signal and filters out noises in the high frequency portion to generate the second output recovered signal Vfb2 with a waveform similar to the feedback signal Vfb. In other words, the comparator 52 can separate the input voltage signal Vin from the mixed signal Mix, and the error amplifier 53 can separate the feedback signal Vfb from the mixed signal Mix. The PWM controller 32 compares the second recovered signal Vfb2 with a ramp signal to generate a comparison signal and generates the first drive signal HSD and the second drive signal LSD to control the duty cycles of the high voltage switch Q1 and the low voltage switch Q2 according to the comparison signal and the first recovered signal Vin2.

Figure 7:
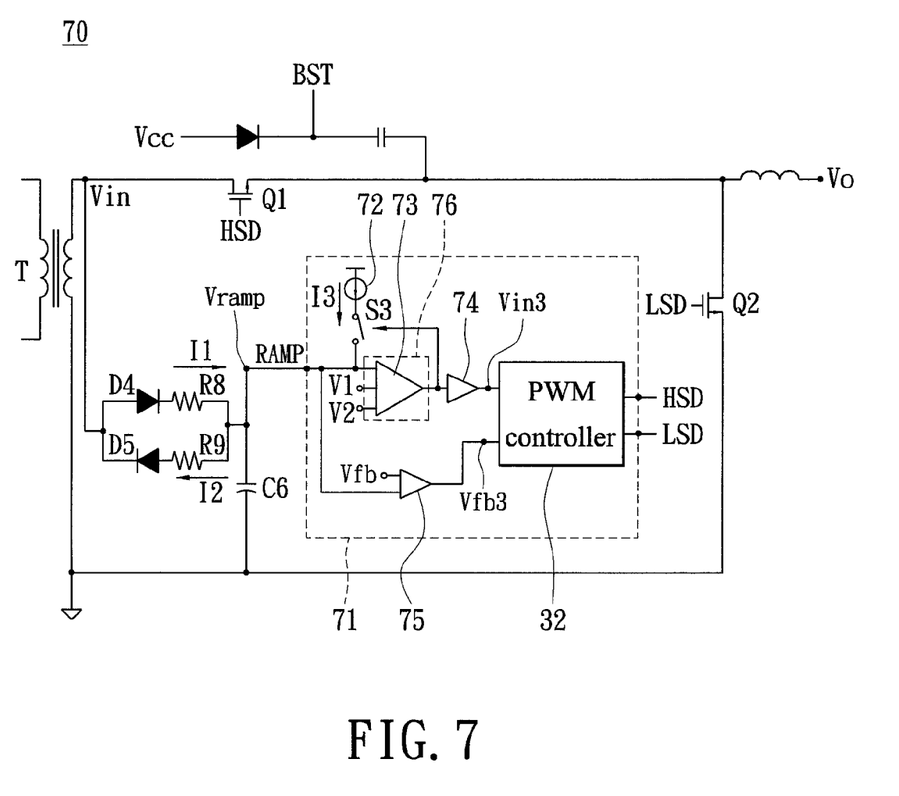
FIG. 7 is a circuit diagram of a synchronous buck DC-to-DC converter circuit in accordance with a third preferred embodiment of the present invention.
Figure 8A:
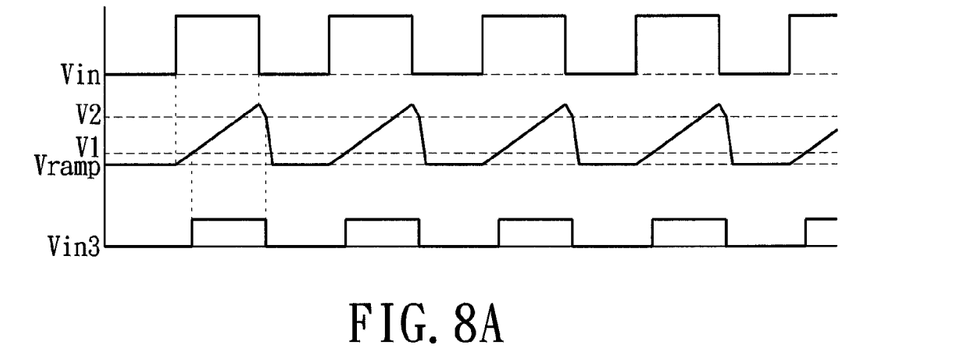
FIGS. 8A and 8B are diagrams showing waveforms of an input voltage signal Vin, a ramp signal Vramp and an recovered signal Vin3 in the converter circuit of FIG. 7 in accordance with two different embodiments of the present invention.

FIG. 7 is a circuit diagram of a synchronous buck DC-to-DC converter circuit in accordance with a third preferred embodiment of the present invention, and a secondary side synchronous buck DC-to-DC converter circuit 70 is illustrated in the present embodiment. FIG. 8A shows waveforms of an input voltage signal Vin, a ramp signal Vramp and an recovered signal Vin3 of the synchronous buck DC-to-DC converter circuit shown in FIG. 7. In contrast with the first embodiment of the present invention, the PWM regulator IC 71 also saves the VIN pin as the PWM regulator IC 11 depicted in FIG. 1, but uses the RAMP pin for receiving the input voltage signal Vin instead.

In FIG. 7, the synchronous buck DC-to-DC converter circuit 70 is installed on a secondary side of a transformer T for receiving an input voltage signal Vin generated by the secondary side of the transformer T. The synchronous buck DC-to-DC converter circuit 70 further includes an external conversion unit coupled to the RAMP pin of the PWM regulator IC 71 for receiving the input voltage signal Vin and converting the input voltage signal Vin into a first current signal I1 to charge the capacitor C6. The potential stored in the capacitor C6 corresponds to a ramp signal Vramp supplied to the RAMP pin.

The external conversion unit includes a charge path and a discharge path for charging and discharging the capacitor C6 respectively. The charge path is composed of a diode D4 and a resistor R8, and the discharge path is composed of a diode D5 and a resistor R9, wherein a forward direction of the diode D4 is from a supply terminal of the input voltage signal Vin to the capacitor C6, and a reverse direction of the diode D5 is form the supply terminal of the input voltage signal Vin to the capacitor C6. In this preferred embodiment, the capacitor C6 is installed outside the PWM regulator IC 71 and coupled to the RAMP pin. The present invention is not limited to such arrangement only. The capacitor C6 can be installed inside the PWM regulator IC 71. In addition, the PWM regulator IC 71 includes a current source 72 and a switch S3 connected in series with the capacitor C6. The conducting status of the switch S3 decides whether the current source 72 charging the capacitor C6 or not.

With reference to FIG. 8A, when the input voltage signal Vin is turned to a high level, the input voltage signal Vin generates a charging current I1 passing through the diode D4 to charge the capacitor C6 slowly so as to raise the level at the RAMP pin. When the potential stored in the capacitor C6, which is also the level of the RAMP pin, exceeds a first predetermined voltage V1, the switch S3 is conducted and the current source 72 starts charging the capacitor C6. It is noteworthy to point out that the charging speed for the current source 72 to charge the capacitor C6 is faster than the charging speed for the charging current I1 to charge the capacitor C6. Thus, the rising slope of the Vramp signal is mainly determined by the current source 72. Subsequently, as the input voltage signal Vin is turned to a low level, the capacitor C6 is discharged rapidly via a discharge path formed by the diode D5. The capacitor C6 discharges through the diode D5 with a discharging speed faster than the charging speed for the current source 72 to charge the capacitor C6. Therefore, the potential stored in the capacitor C6 drops gradually. When the potential stored in the capacitor C6 is lower than a second predetermined voltage V2, the switch S3 is switched off and the current source 72 stops charging the capacitor C6.

The PWM regulator IC 71 further includes a conversion unit 76 installed therein and coupled to the RAMP pin for receiving the ramp signal Vramp. In this preferred embodiment, the conversion unit 76 includes a comparator 73 with a first input terminal for receiving the ramp signal Vramp, a second input terminal for receiving the first predetermined voltage V1, and a third input terminal for receiving the second predetermined voltage V2, wherein the level of the first predetermined voltage V1 is smaller than the second predetermined voltage V2. When the ramp signal Vramp is raised to a level above the first predetermined voltage V1, the comparator 73 output a high level signal. When the ramp signal Vramp is dropped to a level below the second predetermined voltage V2, the comparator 73 outputs a low level signal instead. Therefore, the conversion unit 76 can convert the ramp signal Vramp into a square wave signal Vin3, and the duty cycle of the square wave signal Vin3 is substantially the same as that of the input voltage signal Vin. The conducting status of the switch S3 is determined by the square wave signal Vin3 from the comparator 73. In detail, when the ramp signal Vramp is raised to a level above the first predetermined voltage V1, the comparator 73 outputs a high level signal to conduct the switch S3, such that the current source 72 starts charging the capacitor C6 quickly. When the ramp signal Vramp is dropped to a level below the second predetermined voltage V2, the comparator 73 outputs a low level signal instead to switch off the switch S3 and the current source 72 stops charging the capacitor C6.

The PWM regulator IC 71 includes a PWM controller 32 and a feedback compare circuit 75 installed therein. The feedback compare circuit 75 may be an error amplifier for example. An output terminal of the comparator 73 is coupled to the PWM controller 32 through a buffer 74. The error amplifier 75 has a first input terminal for inputting a ramp signal Vramp, and a second input terminal for inputting a feedback signal Vfb. An output terminal of the error amplifier 75 is also coupled to the PWM controller 32.

The PWM controller 32 outputs a first drive signal HSD and a second drive signal LSD according to the square wave signal Vin3 from the conversion unit 76 and the comparison signal Vfb3 from the error amplifier 75 for controlling the duty cycles of the high voltage switch Q1 and the low voltage switch Q2 respectively.

Figure 8B:
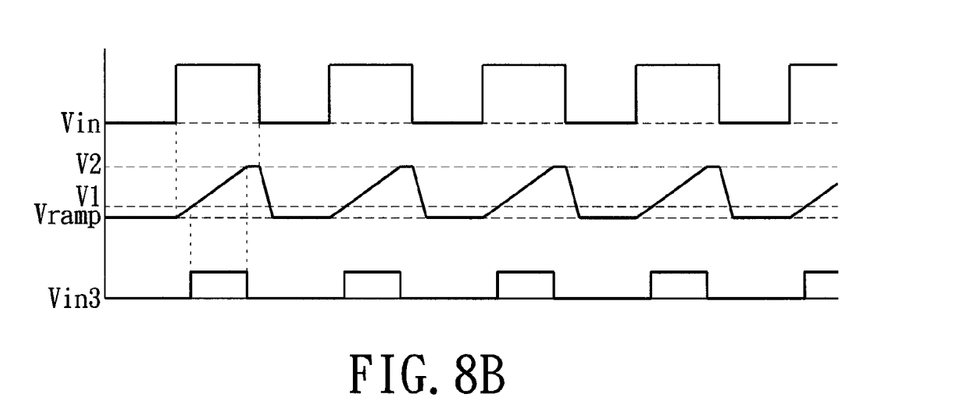

With reference to FIG. 8B for waveforms of the input voltage signal Vin, the ramp signal Vramp and the recovered signal Vin3 of a synchronous buck DC-to-DC converter circuit as depicted in FIG. 7 in accordance with another preferred embodiment of the present invention, when the input voltage signal Vin is turned to a high level, the input voltage signal Vin starts charging the capacitor C6 slowly through the diode D4. When the potential of the capacitor C6 is raised to a level above the first predetermined voltage V1, the comparator 73 outputs a high level signal Vin3 and the switch S3 is conducted by the high level signal Vin3. At this time, the current source 72 generates a charging current I3 to charge the capacitor C6. The charging current I3 is much greater than the charging current I1. Then, when the potential of the capacitor C6 is raised to a level above a second predetermined voltage V2, the comparator 73 outputs a low-level signal Vin3 instead and the switch S3 is switched off by the low level signal Vin3. Meanwhile, the current source 72 stops charging the capacitor C6, and the potential of the capacitor C6 is clamped to a voltage substantially the same as the second predetermined voltage V2. Thereafter, when the input voltage signal Vin is turned to a low level, the capacitor C6 discharges quickly via a discharge path formed by the diode D5 to have the potential stored in the capacitor C6 drop quickly. Thereby, a ramp signal Vramp is generated. In addition, the ramp signal Vramp can be converted into a square wave signal Vin3 with a duty cycle substantially the same as that of the input voltage signal Vin by using the comparator 73.

Figure 9:
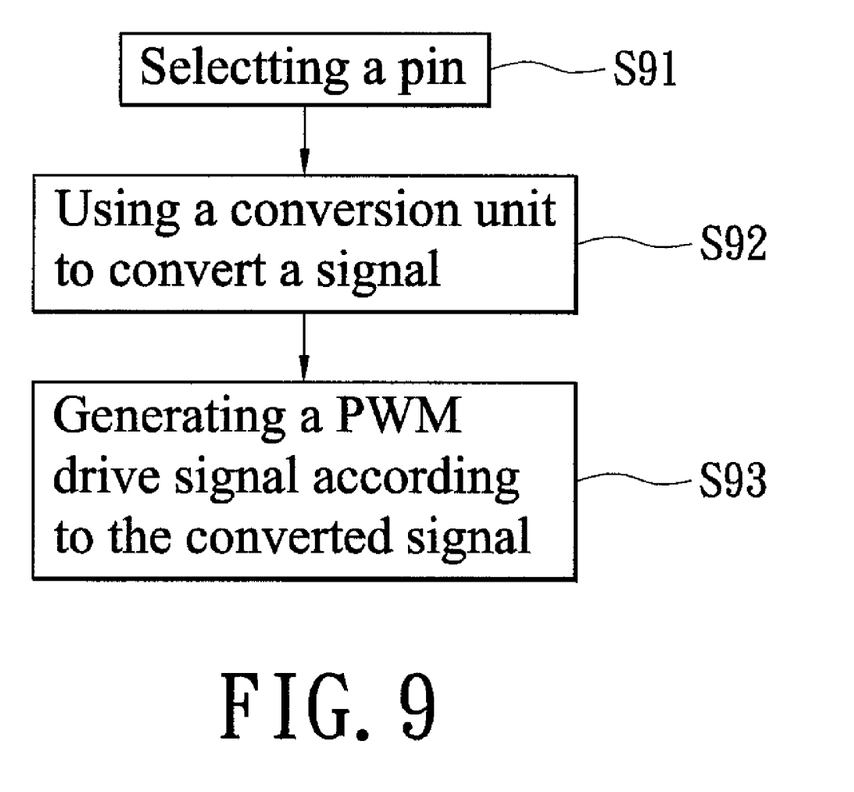
FIG. 9 is a flow chart of a method of reducing the number of pins demanded for a PWM regulator IC in accordance with a preferred embodiment of the present invention.

FIG. 9 is a flow chart showing a method of reducing the number of pins needed for a PWM regulator IC in accordance with a preferred embodiment of the present invention. Firstly, as shown in step (S91), an input pin of the PWM regulator IC corresponding to an input signal different from an input voltage signal Vin is selected. The lasting time of the input signal is substantially the same as the time of the input voltage signal Vin situated at a high level, but their waveforms are different. For example, in the embodiment as shown in FIG. 3, the BST pin is selected, and the lasting time of the bootstrap high voltage signal CKBST inputted to the BST pin as shown in FIG. 4 is substantially the same as the time of the input voltage signal Vin situated at a high level. In the embodiment as shown in FIG. 7, the RAMP pin is selected, and the lasting time of the ramp signal Vramp inputted to the RAMP pin as shown in FIG. 8A is substantially the same as the time of the input voltage signal Vin situated at a high level.

Thereafter, in Step (S92), a conversion unit is used for converting the signal inputted from the selected pin into a square wave signal, such as the signal Vin2 as shown in FIG. 4 and the signal Vin3 as shown in FIG. 8A. Then, in Step (S93), the square wave signal is transmitted to a PWM controller of the PWM regulator IC to generate a PWM drive signal for controlling the duty cycles of the high voltage switch and the low voltage switch. Thus, the VIN pin of the PWM regulator IC can be saved to provide an extra pin for the use of another input signal.

The above-mentioned descriptions represent merely the preferred embodiments of the present invention, without any intention to limit the scope of the present invention thereto. Various equivalent changes, alternations, or modifications based on the claims of the present invention are all consequently viewed as being embraced by the scope of the present invention.

What is claimed is:

1. A pulse width modulation (PWM) regulator integrated circuit (IC), for controlling a duty cycle of at least one switch to convert an input voltage signal into an output voltage, comprising:
    a pin, for receiving an input signal different from the input voltage signal, wherein the input signal has a lasting time substantially the same as a time of the input voltage signal situated at a high level, but the input signal has a waveform different from that of the input voltage signal;
    a conversion unit, coupled to the pin, for converting the input signal into a square wave signal; and
    a PWM controller, for generating at least one PWM drive signal according to the square wave signal to control a duty cycle of the switch;
    wherein the PWM controller generates two PWM drive signals for controlling duty cycles of a high voltage switch and a low voltage switch respectively, the pin is a boost (BST) pin, and the input signal is a bootstrap high voltage signal for providing a voltage required for driving the high voltage switch.

2. The PWM regulator IC of claim 1, wherein the pin is a ramp signal (RAMP) pin and the input signal is a ramp signal, the pin is coupled to an external conversion unit, which is provided for converting the input voltage signal into a first current signal to charge a capacitor with a potential stored therein corresponding to the ramp signal, and the PWM regulator IC further comprises a current source and a charging switch, connected in series with the capacitor, when the potential stored in the capacitor exceeds a first predetermined voltage, the charging switch is conducted to have the current source charging the capacitor, and when the input voltage signal is turned to a low level, the external conversion circuit constitutes a discharge path to discharge the capacitor quickly to drop the potential stored in the capacitor.

3. The PWM regulator IC of claim 2, wherein the current source charges the capacitor with a charging speed much faster than that for the first current signal to charge the capacitor, and a discharging speed of the capacitor through the discharge path is faster than the charging speed for the current source to charge the capacitor.

4. The PWM regulator IC of claim 3, wherein when the potential of the capacitor rises above a second predetermined voltage, the current source stops charging the capacitor.

5. The PWM regulator IC of claim 3, wherein when the potential of the capacitor drops below a second predetermined voltage, the current source stops charging the capacitor.

6. The PWM regulator IC of claim 2, wherein the conversion unit is a comparator.

7. The PWM regulator IC of claim 2, further comprising a feedback compare circuit, for generating a comparison signal to be inputted into the PWM controller according to the ramp signal and a feedback signal, and the PWM controller generates the PWM drive signal according to the square wave signal and the comparison signal.

8. The PWM regulator IC of claim 1, wherein the boost pin is coupled to a bootstrap capacitor, which is coupled between a power supply terminal and the low voltage switch and the bootstrap high voltage signal is generated at a high voltage side of the bootstrap capacitor.

9. The PWM regulator IC of claim 8, wherein the conversion unit is a hysteresis comparator with a first voltage reference level and a second voltage reference level, the hysteresis comparator compares a voltage value of a rising edge of the input signal with the first voltage reference level and compares a voltage value of a falling edge of the input signal with the second voltage reference level, and the first voltage reference level is lower than the second voltage reference level.

10. A pulse width modulation (PWM) synchronous buck DC-to-DC converter circuit, for receiving an input voltage signal and generating an output voltage, comprising:
    at least one switch, a level of the output voltage being adjusted by changing a duty cycle of the switch; and
    a PWM regulator IC, comprising:
    a pin, for receiving an input signal different from the input voltage signal, wherein a lasting time of the input signal is substantially the same as a time of the input voltage signal situated at a high level, but the input signal has a waveform different from that of the input voltage signal;
    a conversion unit, coupled to the pin, for converting the input signal into a square wave signal; and
    a PWM controller, for generating at least one PWM drive signal according to the square wave signal to control a duty cycle of the switch;
    wherein the PWM controller generates two PWM drive signals for controlling duty cycles of a high voltage switch and a low voltage switch respectively, the pin is a boost (BST) pin, and the input signal is a bootstrap high voltage signal for providing a voltage required for driving the high voltage switch.

11. The PWM synchronous buck DC-to-DC converter circuit of claim 10, wherein the pin is a ramp signal pin and the input signal is a ramp signal, and the PWM synchronous buck DC-to-DC converter circuit further comprises an external conversion circuit coupled to the pin for receiving the input voltage signal and converting the input voltage signal into a first current signal to charge a capacitor, and a potential stored in the capacitor corresponds to the ramp signal.

12. The PWM synchronous buck DC-to-DC converter circuit of claim 11, wherein the capacitor is externally coupled to the pin.

13. The PWM synchronous buck DC-to-DC converter circuit of claim 11, wherein the capacitor is located in the pulse width modulation regulator IC.

14. The PWM synchronous buck DC-to-DC converter circuit of claim 11, wherein the PWM regulator IC includes a current source and a charging switch, connected in series with the capacitor, such that when the potential stored in the capacitor exceeds a first predetermined voltage, the charging switch is conducted to have the current source charging the capacitor, and when the input voltage signal is turned to a low level, the external conversion circuit constitutes a discharge path to discharge the capacitor quickly to drop the potential stored in the capacitor, and a charging speed for the current source to charge the capacitor is much faster than a charging speed for the first current signal to charge the capacitor, and a discharging speed of the capacitor through the external conversion circuit is much faster than the charging speed for the current source to charge the capacitor.

15. The PWM synchronous buck DC-to-DC converter circuit of claim 14, wherein when the potential stored in the capacitor rises above a second predetermined voltage, the current source stops charging the capacitor.

16. The PWM synchronous buck DC-to-DC converter circuit of claim 14, wherein when the potential stored in the capacitor drops below a second predetermined voltage, the current source stops charging the capacitor.

17. The PWM synchronous buck DC-to-DC converter circuit of claim 11, wherein the PWM regulator IC includes a feedback compare circuit, for generating and inputting a comparison signal to the PWM controller according to the ramp signal and a feedback signal, and the PWM controller generates the PWM drive signal according to the square wave signal and the comparison signal.

18. The PWM synchronous buck DC-to-DC converter circuit of claim 10, wherein the high voltage switch and the low voltage switch connected in series between an input terminal for inputting the input voltage signal and a ground terminal are used, and the boost pin is coupled to a bootstrap capacitor, which is coupled between a power supply terminal and the low voltage switch, and the bootstrap high voltage signal is generated at a high voltage side of the bootstrap capacitor.

19. The PWM synchronous buck DC-to-DC converter circuit of claim 18, wherein the conversion unit is a hysteresis comparator with a first voltage reference level and a second voltage reference level, the hysteresis comparator compares a voltage value of a rising edge of the input signal with the first voltage reference level and compares a voltage value of a falling edge of the input signal with the second voltage reference level, and the first voltage reference level is lower than the second voltage reference level.

20. A PWM synchronous buck DC-to-DC converter circuit, comprising:
  a wave mixer, for receiving an input voltage signal and a feedback signal, and mixing the input voltage signal and the feedback signal to form a mixed wave signal, wherein the input voltage signal has a frequency much higher than that of the feedback signal; and
  a PWM regulator IC, including:
  an input signal pin, for receiving the mixed wave signal;
  a comparator, for comparing the mixed wave signal with a predetermined voltage level to generate a first recovered signal, which has a duty cycle equal to that of the input voltage signal;
  an error amplifier, for filtering out a high frequency portion of the mixed wave signal to generate a second recovered signal corresponding to the feedback signal; and
  a PWM controller, for comparing the second recovered signal with a ramp signal to generate a comparison signal, and generating a PWM drive signal according to the comparison signal and the first recovered signal.

* * * * *